United States Patent [19]

Jaussi et al.

[11] Patent Number: 4,561,407

[45] Date of Patent: Dec. 31, 1985

[54] CONTROL EQUIPMENT FOR A PRESSURE WAVE SUPERCHARGER

[75] Inventors: Francois A. Jaussi, Wettingen; Andreas Mayer, Niederrohrdorf; Fritz W. Spinnler, Liestal, all of Switzerland

[73] Assignee: BBC Brown, Boveri & Company, Limited, Baden, Switzerland

[21] Appl. No.: 605,909

[22] Filed: May 1, 1984

[30] Foreign Application Priority Data

May 2, 1983 [CH] Switzerland ........................ 2355/83

[51] Int. Cl.[4] ........................................ F02B 33/42

[52] U.S. Cl. ........................................ 123/559; 60/602

[58] Field of Search .................. 60/39.45 A, 600, 601, 60/602, 603; 123/559; 417/64

[56] References Cited

U.S. PATENT DOCUMENTS 4,286,433 9/1981 Detweiler .............................. 60/602
4,311,008 1/1982 Yamada ................................ 60/602
4,488,532 12/1984 Mayer ................................ 123/559

FOREIGN PATENT DOCUMENTS 159923 10/1982 Japan .................................... 60/602
193720 11/1982 Japan .................................... 60/602

OTHER PUBLICATIONS

Brown, Boverie and Co. Publication No. CH-T123,143D, "Aufladung von Fahrzeugdieselmotoren mit Comprex®", also printed in *Automobil-Industrie*, Jan. 1977.

*Primary Examiner*—Michael Koczo
*Attorney, Agent, or Firm*—Burns, Doane, Swecker & Mathis

[57] ABSTRACT

In the control equipment of a pressure wave supercharger for supercharging vehicle internal combustion engines, a precontrol device is provided to actuate the control device, which precontrol device is connected in each case via a precontrol pressure pipe and a control pressure pipe with one or several of the pressure tapping positions located in the region of the supercharge air duct.

6 Claims, 4 Drawing Figures

CONTROL EQUIPMENT FOR A PRESSURE WAVE SUPERCHARGER

FIELD OF INVENTION

The invention relates to control equipment for gas dynamic pressure wave superchargers and more particularly to by-pass control equipment for gas dynamic pressure wave superchargers.

BACKGROUND OF THE INVENTION

In pressure wave superchargers for supercharging internal combustion engines of vehicles, control of the supercharge air pressure is often necessary because of the wide range of engine rotational speeds. Providing the pressure wave supercharger with an exhaust gas by-pass having a shut-off device controlled by a medium may advantageously provide such control. The pressure wave supercharger is, in this case, so designed that the theoretically attainable supercharge pressure, in the absence of exhaust gas blow-down, is greater than the allowable supercharge pressure limit which the engine can withstand at the upper engine rotational speeds. In order, however, to remain below the allowable supercharge pressure limit, part of the exhaust gases must be blown down beyond a certain engine rotational speed. This type of control has a positive effect on the variation of available engine torque and fuel consumption, particularly in the case of engines which are not mainly operated at higher rotational speeds.

A control device for controlling the supercharge pressure by appropriate blow-down of the engine exhaust gases in a pressure wave supercharger, mentioned initially, includes the applicant's own contribution to the state of the art. In this solution, the shut-off device is directly actuated by the gas pressure or any other process pressure. However, the high supercharge pressure reserves of the pressure wave supercharger in the middle rotational speed range cannot be utilised because blowdown of the exhaust gas starts too early, i.e. before the allowable supercharge pressure limit is reached, because of the inertia and an unfavourable opening characteristic of the shut-off device.

OBJECT AND SUMMARY OF THE INVENTION

An object of the present invention is to match the control characteristic of a pressure wave supercharger with the curve of maximum allowable supercharge pressure against engine rotational speed, in order that the advantages of the pressure wave supercharger relative to the exhaust gas turbocharger are fully realized.

This object is achieved, in accordance with the present invention by providing a pressure actuated control device for opening and closing the exhaust by-pass valve and a precontrol device connected to the control device through a control pressure line. The precontrol device communicates the control device with a pressure relief passage when pressure from a region of high pressure discharge of the supercharger is below a regulating value and communicates the control device with the high pressure discharge region of the supercharger when the pressure is above the regulating value.

A pre-control device for acting on the control device is, in fact, known from U.S. Pat. No. 4,311,008. This, however, concerns the exhaust gas by-pass for an exhaust gas turbocharger, the static pressure of the supercharge air acting as control pressure. The ventilation of the control device by permanent leakage must be considered a disadvantage.

The advantages attained by means of the invention are to be seen essentially in that a more favourable variation of engine torque, or a substantially better behavior of the engine during vehicle acceleration, is attained because the engine is operated along the allowable supercharge pressure limit in both the middle and higher rotational speed ranges.

Several preferred embodiments of the present invention are shown in simplified format in the drawing, wherein.

The same parts are provided with the same reference signs in the figures. Parts of the pressure wave supercharger which are superfluous for an understanding the invention, such as the shaft, bearings, drive, etc., are omitted. The flow directions of the working media are indicated by arrows.

DETAILED DESCRIPTION OF THE PREFERRED EMBODIMENTS

The fundamental design of a pressure wave supercharger and its precise structure can be found in the publication Number CH-T123143D of Brown, Boveri and Co.

Figure 1:
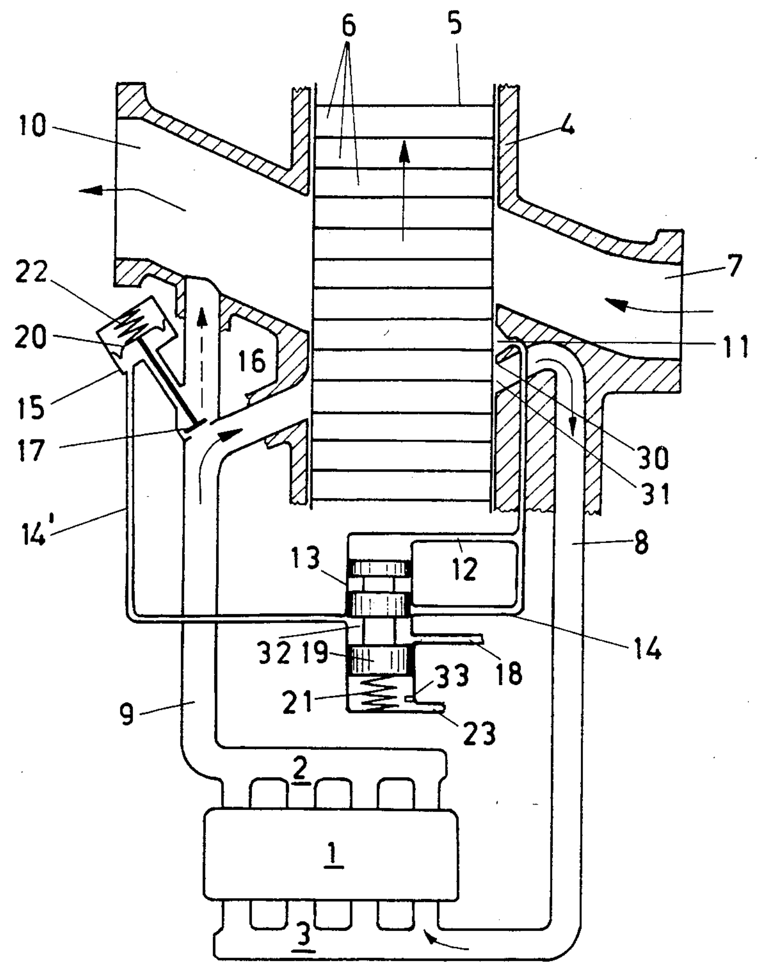
FIG. 1 is a first embodiment of control equipment for a pressure wave supercharger with a pre-control device in accordance with the present invention.

Referring to FIG. 1, pressure wave supercharger is presented, for simplicity, as a single cycle machine, wherein the casing 4 is provided with a high pressure and a low pressure opening on each of the sides facing towards the end surfaces of the rotor 5. The hot exhaust gases from the internal combustion engine 1 pass through the exhaust gas manifold 2 and the engine exhaust gas duct 9 into the pressure wave supercharger rotor 5 having straight axial rotor cells 6 open on both sides. The exhaust gases expand in the rotor and leave it through the exhaust gas duct 10 which leads to an exhaust pipe (not shown) open to the atmosphere. On the air side, atmospheric air is induced through the air induction duct 7 axially into the rotor 5, undergoes compression therein and leaves the rotor in a compressed state through the compressed air duct 8 which leads to the compressed air manifold 3 the internal combustion engine 1.

In order to understand the actual and extremely complex gas dynamics pressure wave process, which is not the subject matter of the invention, reference is made to the BBC publication Number CH-T123143D, already mentioned.

The cycle process necessary for understanding the invention is briefly described below.

The cell strip consisting of the rotor cells 6 is the development of a cylindrical section of the rotor 5, which moves in the direction of the arrow when the rotor rotates. The pressure wave phenomena occur inside the rotor 5 and their essential effect is that a gas filled space and an air filled space are formed in the rotor 5. In the former, the exhaust gas expands and then escapes into the exhaust gas duct 10, whereas in the latter, a part of the induced fresh air is compressed and expelled into the supercharge air duct 8. The remaining proportion of the fresh air is spilled by the rotor 5 into the exhaust gas duct 10 and, by this means, effects complete removal of the exhaust gases. An exhaust gas bypass duct 16, together with a medium controlled shut-off device 17 is located between the engine exhaust gas duct 9 and the exhaust gas duct 10. Below the control limit, the shut-off device 17 is held closed by a preloaded helical spring 22 located in the control device 15. The gas pressure in the engine exhaust duct 9 and the control pressure leading to the control device 15 through the control pressure pipe 14, 14' act in the opening direction of the shut-off device 17. The control pressure, for example the supercharge pressure or the pressure from the expansion pocket 11, is a function of the exhaust gas pressure and the engine rotational speed or engine load. The variation of the control pressure differs depending on the design of the pressure wave supercharger.

It is, therefore, difficult to determine the desired opening point of the shut-off device 17 unambiguously by design methods. It can happen that the shut-off device 17 exhibits leakage below the control limit, i.e. that the forces functioning together in the opening direction are greater than the preloading force on the spring.

In order to facilitate installation on the engine, the control device 15 should be made as small as possible. in consequence, the forces appearing in both the opening and closing directions are small. An excessively small closing force is problematical, however, because it can rapidly drop to zero due to external influences, such as friction and vibration. The shut-off device 17 can then open too early due to such external influences. In order to prevent this, a certain closing force is necessary over the whole range from low engine rotational speeds to immediately below the supercharge pressure limit.

To this extent, the control equipment for a pressure wave supercharger is known. In accordance with the invention, a precontrol device 13 is now provided which serves to act on the control device 15. The precontrol device 13 is connected via a precontrol pressure pipe 12 to one, in each case, of the pressure tapping positions 24, 25, 26, 27 or 28 located, in accordance with FIG. 3, in the region of the supercharge air duct 8 and the expansion pocket 11. The precontrol device 13 is so designed that it holds the path between the control pressure pipe 14' and a pressure relief pipe 18 open at low precontrol pressures and opens the control pressure tube 14, 14' suddenly on attainment of a certain precontrol pressure. The pressure relief pipe 18 located on the precontrol device 13 leads to the open air. An exact control limit can be fixed by the precontrol of the control device 15 and the control device 15 is prevented from blowing down too early in the middle range of engine rotational speed. One of the process pressures occurring at the pressure tapping positions 24, 25, 26, 27 or 28 can be selected in each case for use as the control quantity for the actuation of the precontrol device 13. Similarly, one of the process pressures mentioned can be used in each case as the control variable for the actuation of the control device 15. It is advantageous from the design point of view if the precontrol pressure and the control pressure or auxiliary control pressure are identical; this is not, however, a condition.

In the control equipment represented in FIG. 1, the precontrol device 13 and the control device 15 are subjected to the pressure from the expansion pocket 11. Since the shut-off device 17 is closed in the lower and middle ranges of engine rotational speed, the full supercharge pressure is available for supercharging the engine. In the upper range of engine rotational speed, the shut-off device 17 is opened by the control pressure by means of the control device 15. The load on the diaphragm 20 of the control device 15 due to the control pressure is, however, released by the precontrol device 13 actuated by the pressure in the expansion pocket 11. The switching on and off of the control device 15 takes place, in this case, due to the pressure in the expansion pocket 11, which exhibits a rising curve approximately proportional to the rotational speed. It is lower than the supercharge pressure in the lower and middle rotational speed range. This prevents the shut-off device 17 from blowing down too early in the middle speed range. Using the precontrol pressure from the expansion pocket 11, use can be made of higher supercharge pressures in the middle rotational speed range, which leads to relatively low fuel consumption and exhaust gas smoke production. As the control pressure reduces, the diaphragm chamber of the control device 15 is unloaded or ventilated through the control pressure pipe 14', the intermediate space 31 of the precontrol device 13 and through the pressure unloading pipe 18. This ventilation is controlled by the setting element 19 of the precontrol device 13. Permanent leakage is excluded by this means. The spring preloaded precontrol device 13 closes the control pressure pipe 14 to the control device 15 until shortly before the opening point of the shut-off device 17. After the control limit has been reached, the shut-off device 17 opens suddenly and remains continually open in the upper range of motor rotational speed. If the precontrol pressure in the precontrol pressure pipe 12 decreases below a certain limiting value because of rotational speed or load changes, the precontrol device 13 immediately closes the control pressure pipe 14, 14' to the control device 15. The previous control pressure, which still holds the shut-off device 17 open, continues to act, however, on the diaphragm 20. The control pressure pipe 14' must therefore be rapidly unloaded when the engine rotational speed or load decrease so that the shut-off device 17 closes immediately and, by this means, maintains the full supercharge pressure. Problems with respect to the gas-tightness of the shut-off device 17 can occur when unloading the control pressure pipe 14'. The control pressure acts in the opening direction of the shut-off device 17. In order to obtain a sufficiently large closing force, the difference between the opening pressure and the pressure in the diaphragm chamber must be as large as possible. This can be attained by unloading the diaphragm chamber down to ambient pressure. The supercharge pressure is, by this means, fully available below the control limit. The pressure unloading pipe 18 can, instead of being led to the open air, be led, for example, into the air induction duct 7 where there is a vacuum and where the mouth of this pipe is protected from dirt and sprayed water.

Figure 2:
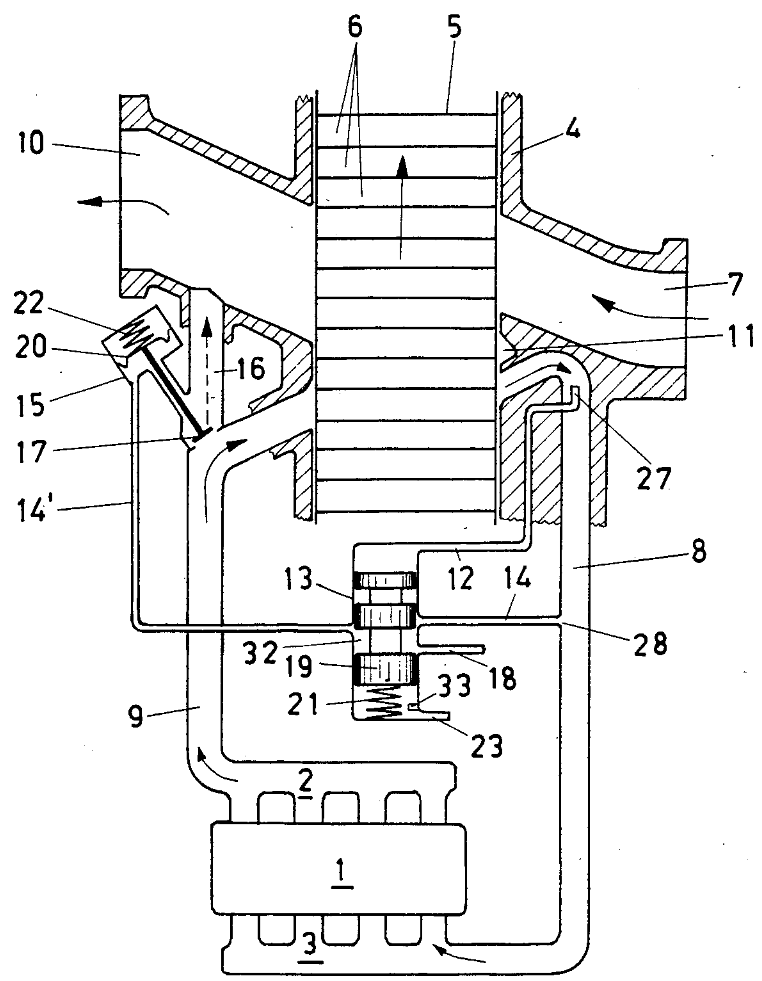
FIG. 2 is a second embodiment of the control equipment in accordance with the present invention.

In the control equipment represented in FIG. 2, the precontrol device 13 is subjected to pressure from the pressure tapping position 27 located centrally in the supercharge air duct 8 and the control device 15 is subjected to pressure from the pressure tapping position 28 located on the wall of the supercharge air duct 8.

Figure 3:
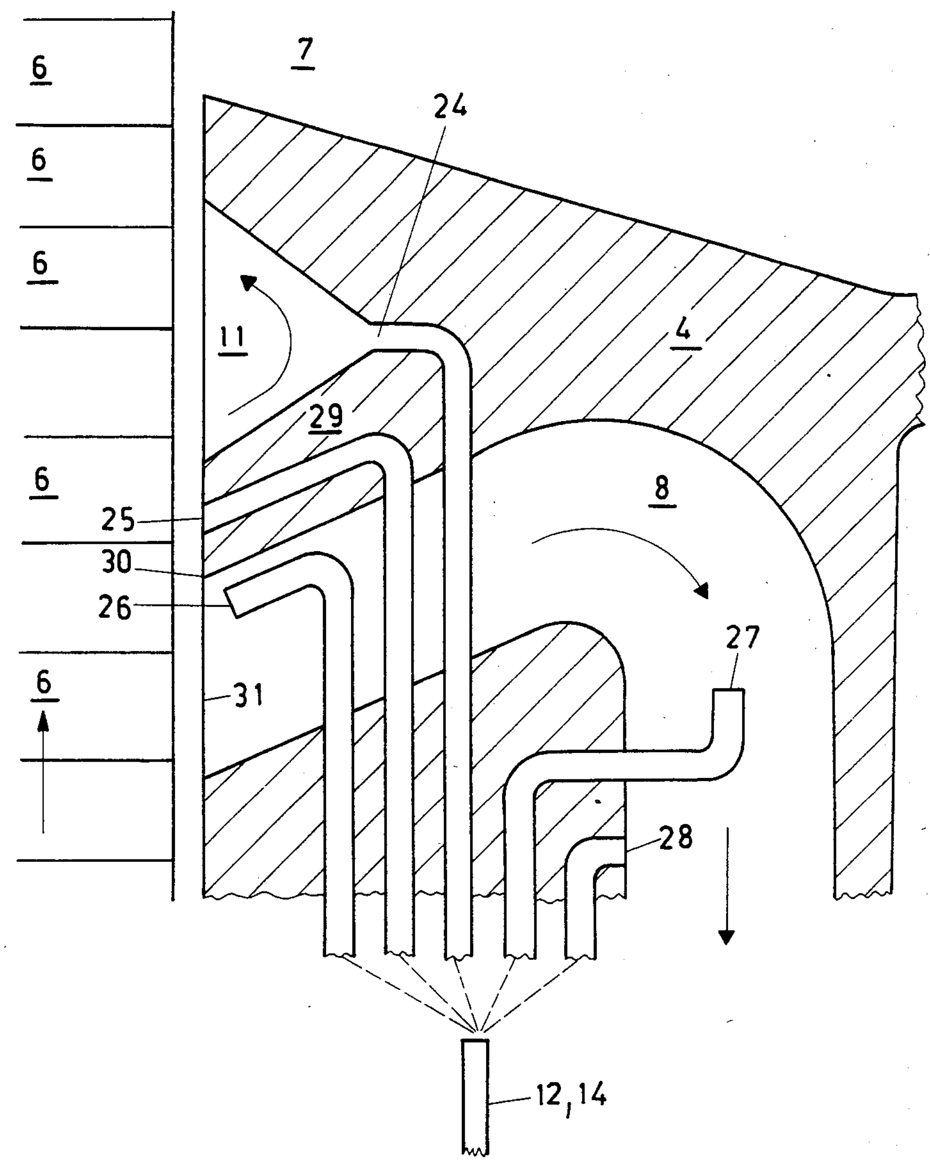
FIG. 3 is various arrangements of pressure-tapping positions about the high pressure discharge region of the pressure wave supercharger.
Figure 4:
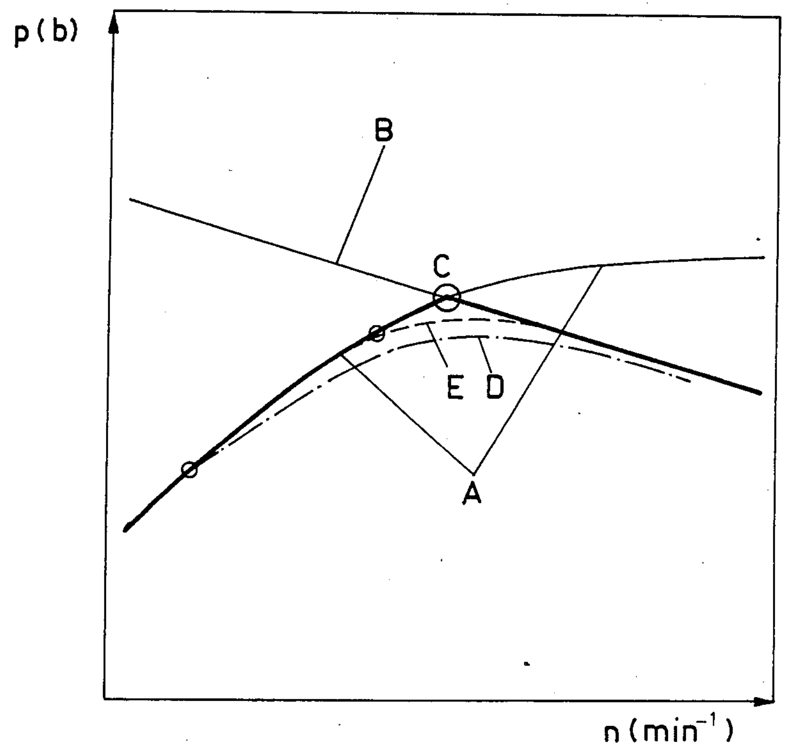
FIG. 4 is a diagrammatic representation of the supercharge pressure curve.

The location of the pressure tapping positions 24, 25, 26, 27 and 28 in the region of the supercharge air duct 8 and the expansion pocket 11 is shown to an enlarged scale in FIG. 3. The pressure tapping position 24 is located directly in the expansion pocket 11. The pressure tapping position 25 is located in the protrusion 29 between the supercharge air duct 8 and the expansion pocket 11. The pressure tapping position 26 is located in the supercharge air duct 8 immediately in front of the closing edge 30 in the supercharge air outlet opening 31 and the pressure tapping position 27 is in the centre of the supercharge air duct 8. The pressure tapping position 28 is located on the wall of the supercharge air duct. The full load curves of these pressures against engine rotational speed differ from one another. The choice of a particular tapping position depends on the shape of the supercharge pressure characteristic of the pressure wave supercharger (Curve A in FIG. 4), and on the shape of the allowable supercharge pressure limit; it also depends on the extent to which the supercharge pressure reserve is to be utilised in the middle range of engine rotational speed. The peak pressure in the cylinder of a supercharged internal combustion engine is a function of the supercharge pressure, the air temperature and the engine rotational speed and is limited, inter alia, by strength reasons. With respect to the peak pressure limit, vehicle internal combustion engines permit a higher supercharge pressure in the middle rotational speed range than in the upper rotational speed range, i.e. the engine permits a supercharge pressure variation which is degressive with engine rotational speed if the engine is to be operated along the supercharge pressure limit. A in FIG. 4 qualitatively represents the curve of attainable supercharge pressure of an internal combustion engine supercharged by a pressure wave supercharger without exhaust gas bypass. The slope of this curve decreases with increasing engine rotational speed. The allowable supercharge pressure limit, which depends on the engine, is shown at B as a straight line with a negative slope (degression variation). The two lines have an intersection at C in the middle range of engine rotational speed. With increasing engine rotational speed, it is advisable—in the lower rotational speed range—to operate along the thickened part of the line A as far as the intersection point C. In order not to exceed the supercharge pressure limit B, the engine should be operated along the thickened part of the line B in the higher rotational speed range. Such a control characteristic with a kink at the point C is difficult to attain. Curve D represents the control characteristic of a pressure wave supercharger without a precontrol device. In this case, it is not possible to operate along the thickened part of the curve A in the lower engine rotational speed range as far as the intersection point C because the supercharge pressure limit would be exceeded due to the inertia and slow opening of the shut-off device 17. The precontrol device 13 helps in this connection. Shortly before the control limit, i.e. before the engine rotational speed associated with the intersection point C is reached, the control pressure pipe 14, 14' is suddenly opened and the full control pressure acts on the diaphragm 20 of the control device 15 and opens the shut-off device 17. E represents a good approximation to the ideal shape (thick lines), which good approximation can only be attained using a pressure wave supercharger equipped with the precontrol device described. The engine should be operated with the highest possible supercharge pressure precisely in the middle range of engine rotational speed in order to attain the greatest possible increase in engine torque. The intersection point C determines the setting of the response pressure in the precontrol device 13.

The manner of operation of the control device is described below.

When the engine is at rest and at low engine rotational speed, the setting element 19 of the precontrol device 13 is held at its upper dead centre under the action of the helical spring 21. In this position of the setting element 19, the pressure in the control pressure pipe 14' is balanced with atmospheric pressure via the intermediate space 32 and the pressure relief pipe 18. The helical spring 22 of the control device 15 acts, in this case, on the diaphragm 20 and holds the shut-off device 17 tightly closed. At low engine rotational speed, the whole of the exhaust gas quantity flows through the engine exhaust gas duct 9 into the rotor 5 of the pressure wave supercharger. The air induced through the air induction duct 7 is subsequently compressed in the rotor cells 6 and led through the supercharge air duct 8 to the engine 1. With increasing motor rotational speed, the pressure at the pressure tapping positions 24, 25, 26, 27 and 28 increases. The pressure acts via the precontrol pressure pipe 12 on the precontrol device 13, displaces the setting element 19 as far as the stop 33 and compresses the helical spring 21. The space under the setting element 19 is relieved by the ventilation opening 23. At a certain engine rotational speed (control limit), the control pressure pipe 14, 14' is suddenly opened. The control pressure penetrates through the control pressure pipe 14, 14' to the control device 15, acts on the diaphragm 20, compresses the helical spring 22 and suddenly opens the shut-off device 17. This permits the engine to be operated along the pressure supercharge characteristic A as far as the vicinity of the intersection point C. Continuing in this way, a very good approximation (curve E in FIG. 4) to the supercharge pressure limit can be attained at higher engine rotational speeds, depending on the choice of pressure tapping position.

The advantage of the invention is to be especially seen in that a favourable variation of engine torque and substantially improved engine behaviour during the acceleration of the vehicle is achieved.

The invention is not, of course, limited to that represented and described. As a variation, the precontrol device 13 could be integrated in the control device 15 and installed in a common casing.

In addition, both the precontrol device 13 and the control device 15 can be so designed that they are actuated by a pressure differential between two arbitrary process pressures.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are intended to be embraced therein.

What is claimed is:

1. In a gas dynamic pressure wave supercharger having a region of high pressure discharge, an exhaust by-pass passage and a by-pass valve opening and closing said by-pass passage, an apparatus for actuating said exhaust by-pass valve comprising:

a control device means for opening and closing said by-pass valve in response to a regulating pressure;

pressure relief means; and a precontrol device including a body movable between a first position communicating said control device means with said region of high pressure discharge and a second position communicating said control device means with said pressure relief means, means for biasing said body toward said second position and means for introducing pressure in opposition to said biasing means from said region of high pressure discharge such that said body remains at said second position until pressure from said region exceeds said regulating pressure and causes said body to locate at said first position.

2. The combination in accordance with claim 1, wherein said region of high pressure discharge includes an expansion pocket and said pressure introducing means includes a tap open to the expansion pocket.

3. The combination in accordance with claim 1, wherein said region of high pressure discharge includes a supercharge air duct, an expansion pocket and a protrusion between the supercharge air duct and the expansion pocket, said pressure introducing means including a tap at said protrusion.

4. The combination in accordance with claim 1, wherein said region of high pressure discharge includes a supercharge air passage with a closing edge, said pressure introducing means including a tap adjacent said closing edge.

5. The combination in accordance with claim 1, wherein said region of high pressure discharge includes a supercharge air duct, and said pressure introducing means includes a tap centrally located in the supercharge air duct.

6. The combination in accordance with claim 1, wherein said region of high pressure discharge includes a supercharge air duct and said pressure introducing means includes a tap along the wall of the supercharge air duct.

* * * * *